(12) United States Patent
Völker

(10) Patent No.: US 8,549,936 B2
(45) Date of Patent: Oct. 8, 2013

(54) SAMPLING VALVE

(76) Inventor: Manfred Völker, Blankenbach (DE)

( * ) Notice: Subject to any disclaimer, the term of this patent is extended or adjusted under 35 U.S.C. 154(b) by 281 days.

(21) Appl. No.: 12/937,556

(22) PCT Filed: Apr. 3, 2009

(86) PCT No.: PCT/DE2009/000466
§ 371 (c)(1),
(2), (4) Date: Oct. 13, 2010

(87) PCT Pub. No.: WO2009/129770
PCT Pub. Date: Oct. 29, 2009

(65) Prior Publication Data
US 2011/0031428 A1    Feb. 10, 2011

(30) Foreign Application Priority Data
Apr. 21, 2008  (DE) .......................... 10 2008 019 982

(51) Int. Cl.
*B01L 3/02*    (2006.01)

(52) U.S. Cl.
USPC ....................................................... 73/864.15

(58) Field of Classification Search
USPC ............... 73/864.63, 864.16, 863.73, 864.15, 73/863.72; 251/366, 367; 137/829, 238, 137/241, 242, 247, 247.13, 8
See application file for complete search history.

(56) References Cited

U.S. PATENT DOCUMENTS 3,044,493 A * 7/1962 Welty et al. ............... 137/625.32
4,056,085 A * 11/1977 Nowroski et al. .............. 123/574
6,517,049 B2 * 2/2003 Coppock ....................... 251/329

* cited by examiner

*Primary Examiner* — Peter Macchiarolo
*Assistant Examiner* — Tamiko Bellamy
(74) *Attorney, Agent, or Firm* — Hammer & Associates, P.C.

(57) ABSTRACT

The sampling valve comprises a valve body that is movable in a valve housing between a closing position and an opening position of the sampling valve, and is characterized in that the valve body comprises an outlet bore for the sample to be taken, the outlet bore continuously increasing in size towards the free end of the valve body, and that the lower edge of the outlet bore is sloping downwards towards the free end. After a sample has been taken, there will be no drops remaining in the outlet bore, whereby a source of contamination for a sample taken that has so far been encountered frequently is now eliminated.

15 Claims, 4 Drawing Sheets

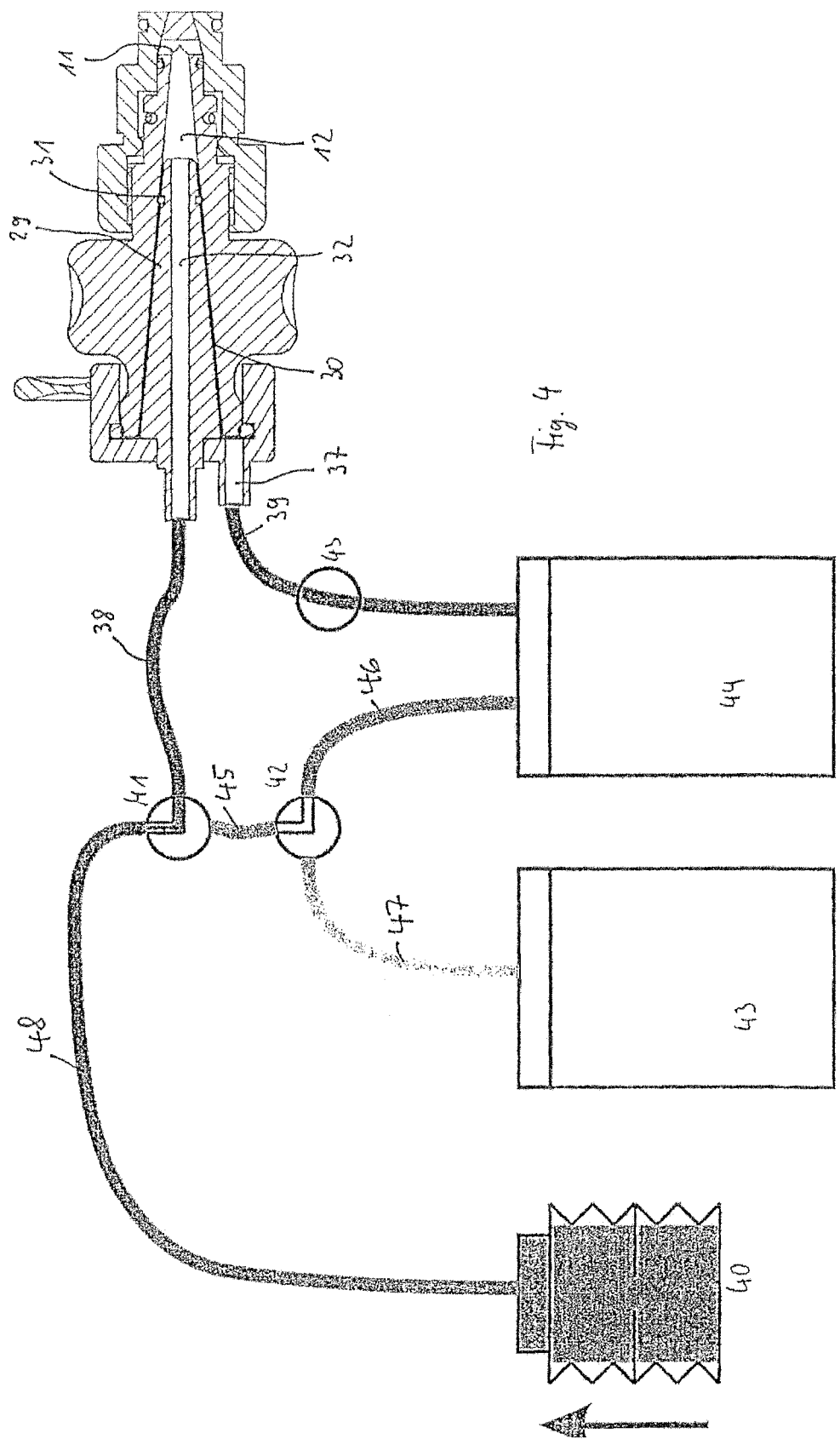

SAMPLING VALVE

The present invention relates to a sampling valve comprising a valve body that is movable in a valve housing between a closing position and an opening position of the sampling valve, wherein in the opening position a sample of a liquid is taken for instance from a line conducting the liquid or from a container containing the liquid.

Samples of the liquids used must be taken in many fields, and the samples must be analyzed with respect to their condition. Food processing, pharmacy or medical sectors, e.g. dialysis, are here named as examples, in the case of which it is extremely important that the water used is sterile. The liquid to be analyzed is often water without the invention being limited thereto.

Normally, the samples are taken by means of sampling valves from a line or a container, but the valves that have so far been known have the drawback that they may contaminate the sample taken. This may be caused by a dead space in the valve body where germs might collect, but a main drawback of the former valves must be seen in the fact that their outlet channel is not fully drained during or after sampling. Drops that might cause contamination of the next sample to be taken or that can also cause back-contamination of the original liquid remain on the wall of the outlet channel of the formerly known valves.

It is the object of the present invention to indicate a sampling valve in which these drawbacks are predominantly avoided.

This object is achieved according to the invention with the features of patent claim 1.

Advantageous designs of the invention are characterized in the sub-claims.

According to the invention the valve body comprises an outlet bore for the sample to be taken, the outlet bore continuously increasing in size towards the free end of the valve body, with the lower edge of the outlet bore sloping downwards towards the free end.

It is here preferred that the outlet bore is continuously increasing in size towards the free end of the valve body, i.e. also without any sudden change in the contour, the outlet bore preferably having a circular cross-sectional shape. However, an oval cross-sectional shape is also within the scope of the invention.

What is mostly preferred is that the outlet bore extends up to the free end in the form of a funnel or trumpet.

While water drops always remain stuck to the wall of a cylindrical outlet bore, it has surprisingly been found that the outlet bore configured according to the invention is drained upon or after sampling. The reason is that the balance between the adhesion to the wall and the cohesion of the water and its mass becomes so unstable due to the continuously increasing diameter that the outlet bore is drained. This effect, which is achieved by way of the special configuration, can be intensified by surface measures, such as nanocoating. In the valve body configured according to the invention, this effect can be observed without the wall of the outlet bore having been treated in any special way, with the valve body being e.g. made of PVDF, PE, PP or stainless steel.

According to the invention the lower edge of the outlet bore must extend at an angle relative to the horizontal towards the free end downwards, so that the sample taken runs off through the outlet bore e.g. into a sterile bag, and remaining drops can drip off from the wall of the outlet bore and can exit out of the bore. It is here preferred that the longitudinal central axis of the outlet bore of the valve body extends in the installed position thereof substantially horizontally or even better obliquely downwards.

Since in the sampling valve according to the invention no drops remain in the outlet bore after sampling, one source of contamination for a sample taken that has frequently been encountered so far is now eliminated. It is here within the scope of the invention that the sampling valve according to the invention can be additionally flushed and/or sterilized prior to or after sampling, which can be carried out in the way described further below preferably with the help of an adapter and a coupling piece in a particularly simple way. The outlet bore can also be flame-treated with the help of a Bunsen burner, as is used in microbiology, the flame even reaching the rearmost region of the conical outlet bore, which would not be possible in the case of a cylindrical bore.

In a further configuration of the invention it is intended that the preferably conical outlet bore extends in the valve body up to a transverse bore in which the outlet bore terminates, the transverse bore extending through a preferably conical end section of the valve body that in the closed position of the valve firmly abuts on the surrounding portion of the valve housing that forms a valve seat. It is here also possible to arrange two or more transverse bores into which in the opening state of the sampling valve the liquid to be taken enters and in which it passes into the outlet bore. Preferably, two transverse bores extend in the closing position of the valve with an inclination downwards towards the connection point with the outlet bore, so that no liquid remains in the transverse bores after the valve has been closed. Instead of the transverse bore, one or more longitudinal bores may be provided that terminate in the conical circumferential wall.

The closing position of the valve body is preferably defined in that the valve body locks into the housing in an easily detachable way for instance with a locking nose.

In one embodiment of the invention, the valve body is in threaded engagement with the housing and is moved thereby between the opening position and the closing position such that the valve body is rotated by means of a preferably molded-on rotary handle in the valve housing, whereby the valve body moves back and forth in the valve housing.

In another embodiment of the invention, the valve body is non-rotatably, but longitudinally slidably, seated in the valve housing, with a coupling nut being in threaded engagement with the valve housing and, when rotated, entraining the valve body in the associated longitudinal direction. The coupling nut is here rotatably arranged relative to the valve body, but is longitudinally coupled with the valve body for joint movement.

The valve housing may be provided with an external thread with which it can be screwed into a threaded bore in the wall of a liquid-conducting line or into a threaded bore of a container containing the liquid, this operation being carried out without any leakage.

In another configuration of the invention, the valve housing is integrated into the line conducting the liquid or is formed by a block-shaped line section, wherein the block-shaped line section may have further functions.

In a further configuration of the invention, an adapter may be provided that can preferably be inserted in a substantially form-fit way into the outlet bore, and which contains a through bore that is connectable to a sample connection line. The sample connection line can here e.g. lead into a sample container which receives the sample taken.

In this connection it should be noted that the sampling operation can also be performed without said adapter in that the sample taken runs out of the outlet bore of the valve body into a container positioned thereunder.

When the above-mentioned adapter is used, said adapter is fastened—expediently in the position where it is inserted into the outlet bore—by a coupling piece to the valve body; the coupling piece can here be fastened in an easily detachable way, for instance by way of a U-shaped clip, in a surrounding groove of the valve body. This coupling piece can be provided with a flushing connection that communicates with an annular gap that remains between the outlet bore and the adapter.

In this configuration of the invention a flushing operation or a sterilizing operation of the sampling valve can be carried out in an easy way in that a flushing or sterilizing liquid is introduced through the through bore of the adapter into the outlet bore, flows back through the annular gap between the outlet bore and the adapter to the flushing-connection pipe nozzle of the coupling piece and from there it flows off through a connected hose into a container. The flushing liquid or disinfecting liquid is preferably supplied from a bellows container, the necessary pressure for the supply of the liquid into the valve body being exerted by compressing said container.

The sampling valve according to the invention is distinguished in that after the sampling operation a much smaller amount of liquid remains in the outlet bore than in the prior art, with the outlet bore increasing in size preferably conically towards the free end. The sampling valve is without any dead space and without any gap when the transverse or longitudinal bores are obliquely extending, and moreover the valve does not put up any flow resistance. The valve can be exchanged easily and is substantially drained towards the sampling side, so that it dries up by itself within a short period of time. Moreover, it can be easily disinfected with a spray type disinfectant and can be easily flame-treated from the inside. Furthermore, a sterile plug can prevent contamination or promote desiccation.

Furthermore, the present invention refers to an arrangement for taking a sample with the sampling valve according to the invention, wherein the adapter is inserted into the valve body and is fastened with the coupling piece. In this arrangement a hose is connected to a connection nozzle of the adapter and leads to a valve from which a further hose leads to a two-way valve to which two hoses are connected, of which one leads to a sample container and the other one to a flushing container.

With this arrangement the sampling valve can first be flushed in its opened state with sample liquid taken, which liquid is discharged by the two-way valve into a flushing container. The two-way valve is thereafter switched, so that sample liquid that is subsequently taken passes into the sample container for analyzing the liquid with respect to its condition.

To be able to flush or clean the sampling valve with an external flushing liquid or disinfecting liquid, the valve first mentioned above may further be configured as a two-way valve, from which a further hose leads to a container with flushing liquid or disinfecting liquid. This container can be configured as a bellows. The flushing liquid or disinfecting liquid can be conveyed by exerting pressure on said container through the adapter into the interior of the valve body, with the liquid running off to the flushing container through a hose connected to a pipe nozzle of the coupling piece.

All hoses, associated valves and containers or bags are provided according to a further proposal of the invention as disposables or single-use articles.

Further features, advantages and details of the invention become apparent from the following description and the attached drawings, in which:

FIG. 4 shows the arrangement according to FIG. 3 with containers and hose lines.

Figure 1:
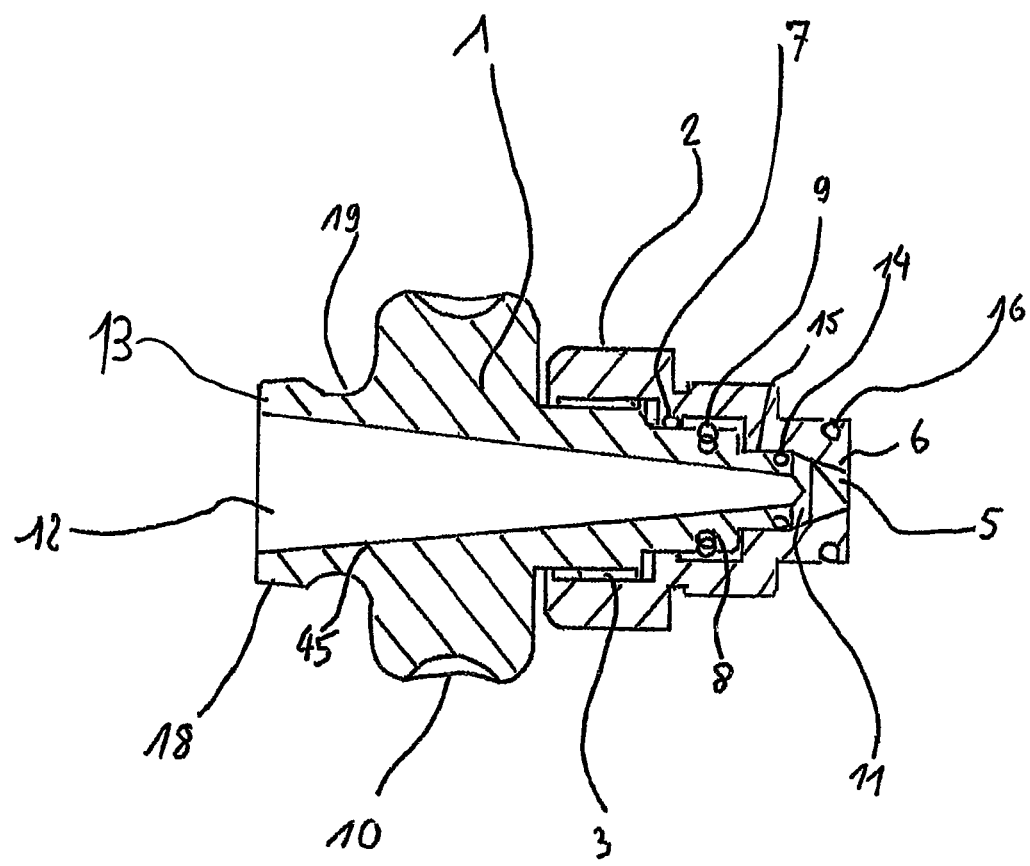
FIG. 1 is a vertical section through a first embodiment of the sampling valve.

In the embodiment of the sampling valve as shown in FIG. 1, a valve body 1 is in threaded engagement with a valve housing 2; to this end the valve body is provided with an external thread that engages into a corresponding internal thread of the valve housing 2 (at 3). In the closed position of the valve, a conical end section 5 of the valve body 1 is firmly pressed against a correspondingly shaped valve seat 6 of the valve housing 2, whereby a water-tight closure or seal is formed. Together with a protruding ring 9 which is inserted into an outer groove 8 of the valve body 1, a radially inner projection of the housing forms an anti-slip means for the valve body 1. The valve body 1 is rotated by means of a rotary handle formed thereon.

In the area of the conical end section 5 the valve body 1 comprises a continuous transverse bore 11 in which a conical outlet bore 12 terminates that is getting larger towards the free end 13 of the valve body 1. The transverse bore 11 consists preferably of two bore sections extending at an angle relative to each other, which in the closing position of the valve extend obliquely downwards towards the outlet bore 12 (although this cannot be seen in FIG. 1). The lower edge (45) of the outlet bore (12) is sloping downwards towards the free end (13).

The valve body 1 is sealed by means of an annular seal 14 relative to a cylindrical wall section 15 of the housing 2, the annular seal 14 being closely arranged behind the transverse bore 11, so that virtually no dead space is here formed in the opening position of the valve. Thus the sample liquid, which is e.g. taken from a line conducting the liquid, only passes up into the area of the lateral openings of the transverse bore 11 if the valve is opened.

Moreover, the housing 2 comprises an outer annular seal 16 for the liquid-tight insertion into a bore in the wall of a line or a container. For the connection of a coupling piece 17, as shown in FIGS. 3 and 4, the valve body 1 comprises a valve nipple 18 which is separated from the rotary handle 10 by a surrounding groove 19.

Figure 2:
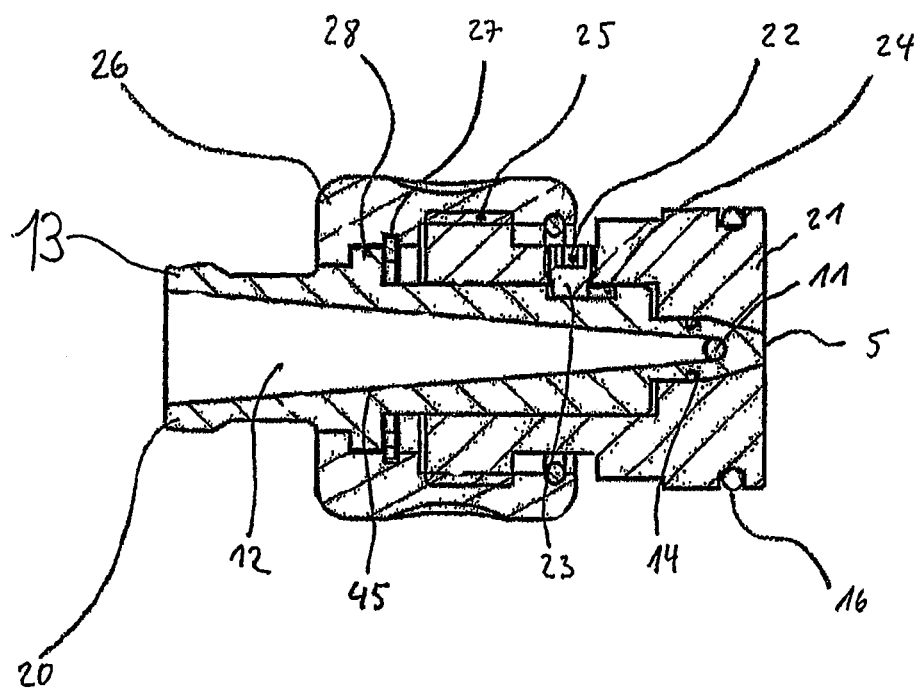
FIG. 2 is a vertical section through a second embodiment of the sampling valve.

In the embodiment shown in FIG. 2, the valve body 20 is non-rotatably arranged in the valve housing 21, but is slidably arranged relative to said housing in longitudinal direction. To this end a screw 22 passes through a through bore of the housing 21 and engages with its shaft 23 into a groove 24 extending in the direction of the longitudinal axis of the valve body 20. Due to this engagement the range of movement of the valve body 20 is limited in the housing 21.

A coupling nut 26 is rotatably seated on the valve body 20 and is (at 25) in threaded engagement with an external thread of the housing 21. The coupling nut 26 is connected via a ring 27 and an entrainer 28 of the valve body 20 to the valve body 20 for joint axial movement.

Hence, the valve body 20 is reciprocated between the opening position of the valve and its closing position by rotating the coupling nut 26.

Figure 3A:
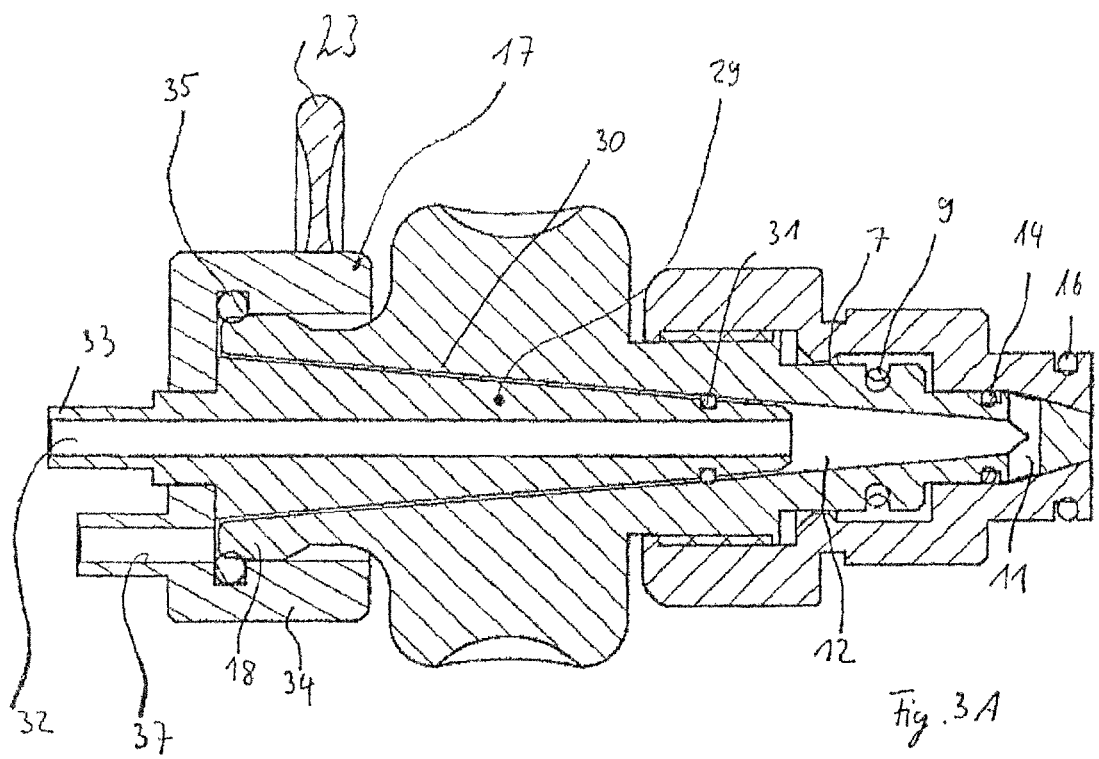
FIGS. 3A and 3B show the sampling valve according to FIG. 1 with adapter and coupling piece in a vertical section and in a horizontal section.
Figure 3B:
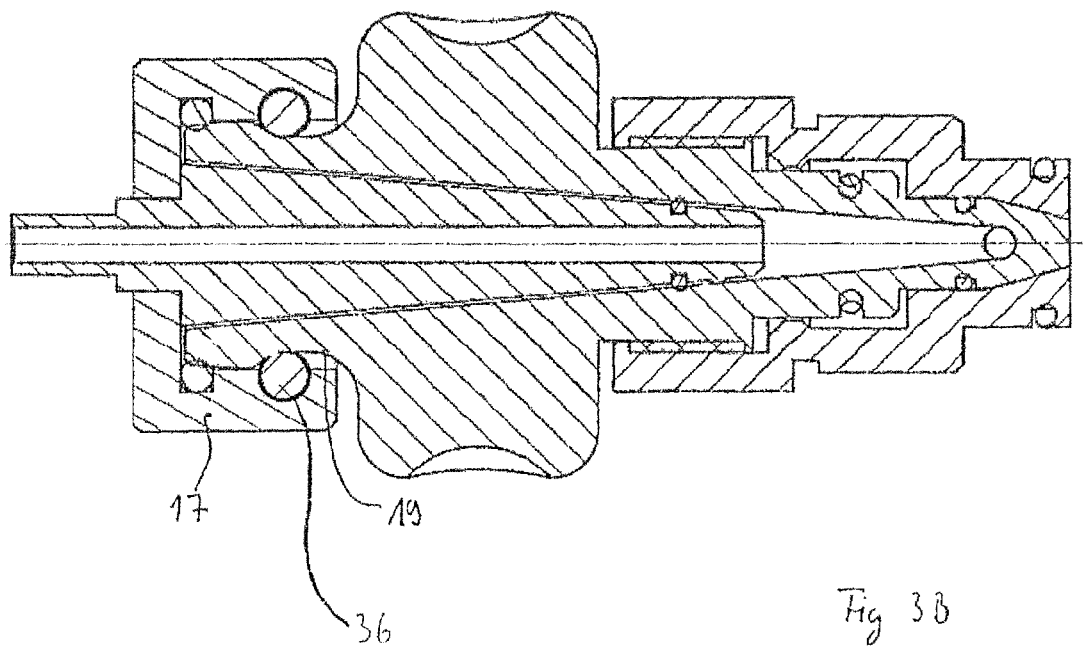

In the arrangement as shown in FIGS. 3A, 3B and 4, an adapter 29 is inserted into the outlet bore 12, with a small annular gap 30 remaining between the wall of the outlet bore 12 and the adapter 29. Upon sampling with inserted adapter 29 said gap 30 is closed by an annular seal 31 which is inserted into a circumferential nut of the adapter 29.

A cylindrical bore 32 which ends in a connection nozzle 33 of the adapter 29 passes through the adapter 29.

The adapter 29 is held in its installed position by a coupling piece 17 that encompasses the valve nipple 18 with a cylindrical section 34. An annular seal 35 ensures a watertight connection. The coupling piece 17 is fastened by means of a U-shaped clip 36 in the groove 19, the clip 36 passing through corresponding through bores of the coupling piece 17.

A pipe nozzle 37 which is in communication with the annular gap 30 is formed on the coupling piece 17.

As shown in FIG. 4, hoses 38 and 39 can be mounted on the pipe nozzles 33 and 37. A flushing liquid or a disinfecting liquid from a bellows container 40 can be introduced through the hose 38 into the sampling valve, with the necessary pressure being created by compressing the bellows container 40. Line 38 has inserted therein a flushing and sampling line valve 41 which in the event that a sample is taken passes the liquid sample taken via a further valve 42 into a sample container 43.

In the case of a flushing or disinfecting process, the outer annular seal 31 of the adapter 29 is removed, so that the liquid introduced through the bore 32 of the adapter 29 into the adjoining outlet bore 12 and the transverse bore(s) 11 runs off through the annular gap 30 and the flushing connection 37, the hose 39 connected thereto and a flushing line valve 43 into a flushing container/disinfectant container 44.

It should be noted that the invention is not limited to the described and illustrated embodiments. Rather, all of the disclosed features can be combined in any way individually with one another.

The invention claimed is:

1. A sampling valve for an aqueous liquid comprising:
   a valve body that is movable in a valve housing between a closing position and an opening position of the sampling valve,
   the valve body (1, 20) comprises an outlet bore (12) for the sample to be taken,
   the outlet bore continuously increasing in size towards the free end of the valve body (1, 20),
   a transverse bore (11) terminating in the outlet bore (12), whereby a sample of the aqueous liquid to be taken enters through the transverse bore (11) into the outlet bore (12),
   said outlet bore (12) increasing in size continuously from the mouth of the transverse bore (11) to the free end of the valve body, and
   the lower edge (45) of the outlet bore (12) is sloping downwards towards the free end (13).

2. The sampling valve according to claim 1, characterized in that the outlet bore has the shape of a funnel or trumpet.

3. The sampling valve according to claim 1, characterized in that the valve body (1) is rotatably arranged in the valve housing (2).

4. The sampling valve according to claim 1, characterized in that the valve body (20) is arranged to be non-rotatable, but in the direction of the longitudinal axis thereof to be slidable in the valve housing (21).

5. The sampling valve according to claim 1, characterized in that the valve housing (2, 21) is provided with an external thread with which the valve housing (2, 21) can be screwed into a threaded opening in the wall of a liquid-conducting line or of a liquid-containing container.

6. The sampling valve according to claim 1, characterized in that the valve housing is formed by a block-shaped line section inserted into a line conducting the liquid.

7. The sampling valve according to claim 1, characterized by an adapter (29) which can be inserted into the outlet bore (12) and contains a through bore (32) which is connectable to a connection line (38).

8. The sampling valve according to claim 7, characterized in that the adapter (29) in the position where it is inserted into the outlet bore (12) is fastened by a coupling piece (17) to the valve body (1).

9. The sampling valve according to claim 8, characterized in that the coupling piece (17) is provided with a flushing connection (37) which communicates with an annular gap (30) between the outlet bore (12) and the adapter (29).

10. An arrangement for taking a sample, comprising a sampling valve according to claim 8, characterized by a hose (38) which is connectable to a connection nozzle (33) of the adapter (29) and a valve (41) from which a further hose (45) leads to a two-way valve (42) from which two hoses (46, 47) lead to a sample container (43) and to a flushing container (44).

11. The arrangement according to claim 10, characterized in that the valve (41) is also a two-way valve from which a further hose (48) leads to a container (40) with flushing liquid or disinfecting liquid.

12. The arrangement according to claim 11, characterized in that the container (40) is designed as a bellows container.

13. The arrangement according to claim 10, characterized in that a hose (38) is connectable to a pipe nozzle (37) of the coupling piece (17), with the hose (39) leading to the flushing container (44).

14. The arrangement according to claim 10, characterized in that the hoses (38, 39, 45, 46, 47, 48) and the containers (40, 43, 44) are disposables.

15. A sampling valve for an aqueous liquid comprising:
   a valve body that is movable in a valve housing between a closing position and an opening position of the sampling valve,
   the valve body (1, 20) comprises an outlet bore (12) for the sample to be taken,
   the outlet bore continuously increasing in size towards the free end of the valve body (1, 20),
   the lower edge (45) of the outlet bore (12) is sloping downwards towards the free end (13), and
   an adapter (29) which can be inserted into the outlet bore (12) and contains a through bore (32) which is connectable to a connection line (38).

* * * * *